(12) United States Patent
Cha et al.

(10) Patent No.: US 12,191,468 B2
(45) Date of Patent: Jan. 7, 2025

(54) BATTERY MODULE, AND BATTERY PACK AND POWER STORAGE DEVICE INCLUDING SAME

(71) Applicant: LG ENERGY SOLUTION, LTD., Seoul (KR)

(72) Inventors: Hun Cha, Daejeon (KR); Jong-Seung Na, Daejeon (KR); Sang-Jun Park, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 505 days.

(21) Appl. No.: 17/620,037

(22) PCT Filed: Jul. 2, 2020

(86) PCT No.: PCT/KR2020/008694
§ 371 (c)(1),
(2) Date: Dec. 16, 2021

(87) PCT Pub. No.: WO2021/002712
PCT Pub. Date: Jan. 7, 2021

(65) Prior Publication Data
US 2022/0263161 A1 Aug. 18, 2022

(30) Foreign Application Priority Data
Jul. 3, 2019 (KR) ........................ 10-2019-0080194

(51) Int. Cl.
*H01M 10/6568* (2014.01)
*H01M 10/613* (2014.01)
(Continued)

(52) U.S. Cl.
CPC ..... *H01M 10/6568* (2015.04); *H01M 10/613* (2015.04); *H01M 10/653* (2015.04);
(Continued)

(58) Field of Classification Search
CPC ............. H01M 10/613; H01M 10/653; H01M 10/6555; H01M 10/6567; H01M 10/6568;
(Continued)

(56) References Cited

U.S. PATENT DOCUMENTS 8,067,111 B2 11/2011 Koetting et al.
2011/0206964 A1 8/2011 Odumodu et al.
(Continued)

FOREIGN PATENT DOCUMENTS

| CN | 104617352 A | 5/2015 |
|---|---|---|
| CN | 109524741 A | 10/2024 |

(Continued)

OTHER PUBLICATIONS

International Search Report for PCT/KR2020/008694 (PCT/ISA/210) mailed on Oct. 26, 2020.
(Continued)

*Primary Examiner* — Victoria H Lynch
(74) *Attorney, Agent, or Firm* — Birch, Stewart, Kolasch & Birch, LLP (57) ABSTRACT

A battery module includes a plurality of battery cells assemblies, each having a plurality of battery cells stacked on each other; and at least one cooling unit provided between the plurality of battery cells assemblies and filled with a predetermined coolant therein, the at least one cooling unit having at least one membrane member provided at one end thereof to be opened or closed according to a change of an internal pressure thereof.

11 Claims, 9 Drawing Sheets

(51) Int. Cl.
  *H01M 10/653* (2014.01)
  *H01M 50/224* (2021.01)
  *H01M 50/273* (2021.01)

(52) U.S. Cl.
  CPC ....... *H01M 50/224* (2021.01); *H01M 50/273* (2021.01); *H01M 2200/20* (2013.01)

(58) Field of Classification Search
  CPC .......... H01M 10/658; H01M 2200/20; H01M 50/224; H01M 50/273; Y02E 60/10
  See application file for complete search history.

(56) References Cited

U.S. PATENT DOCUMENTS

| | | |
|---|---|---|
| 2013/0130074 A1 | 5/2013 | Simons et al. |
| 2018/0034116 A1 | 2/2018 | Tajima et al. |
| 2019/0027721 A1 | 1/2019 | Yun et al. |

FOREIGN PATENT DOCUMENTS

| | | |
|---|---|---|
| EP | 3671943 A1 | 6/2020 |
| JP | 10-241738 A | 9/1998 |
| JP | 2013-12463 A | 1/2013 |
| JP | 2013-62207 A | 4/2013 |
| JP | 2016-100193 A | 5/2016 |
| JP | 2016-146298 A | 8/2016 |
| JP | 6245065 B2 | 12/2017 |
| JP | 2019-79605 A | 5/2019 |
| JP | 2019-87402 A | 6/2019 |
| KR | 10-2012-0065025 A | 6/2012 |
| KR | 10-2016-0058674 A | 5/2016 |
| KR | 10-2018-0035598 A | 4/2018 |
| KR | 10-2018-0113809 A | 10/2018 |
| WO | WO 2017/000297 A1 | 1/2017 |
| WO | WO 2019/059198 A1 | 3/2019 |

OTHER PUBLICATIONS

Indian Office Action for Indian Application No. 202217001749, dated May 31, 2023, with English translation.
Extended European Search Report for European Application No. 20834877.1, dated May 17, 2024.

BATTERY MODULE, AND BATTERY PACK AND POWER STORAGE DEVICE INCLUDING SAME

TECHNICAL FIELD

The present disclosure relates to a battery module, and a battery pack and an energy storage system including the battery module.

The present application claims priority to Korean Patent Application No. 10-2019-0080194 filed on Jul. 3, 2019 in the Republic of Korea, the disclosures of which are incorporated herein by reference.

BACKGROUND ART

Secondary batteries which are highly applicable to various products and exhibit superior electrical properties such as high energy density, etc. are commonly used not only in portable devices but also in electric vehicles (EVs) or hybrid electric vehicles (HEVs) driven by electrical power sources. The secondary battery is drawing attentions as a new energy source for enhancing environment friendliness and energy efficiency in that the use of fossil fuels can be reduced greatly and no byproduct is generated during energy consumption.

Secondary batteries widely used at the preset include lithium ion batteries, lithium polymer batteries, nickel cadmium batteries, nickel hydrogen batteries, nickel zinc batteries and the like. An operating voltage of the unit secondary battery cell, namely a unit battery cell, is about 2.5V to 4.5V. Therefore, if a higher output voltage is required, a plurality of battery cells may be connected in series to configure a battery pack. In addition, depending on the charge/discharge capacity required for the battery pack, a plurality of battery cells may be connected in parallel to configure a battery pack. Thus, the number of battery cells included in the battery pack may be variously set according to the required output voltage or the demanded charge/discharge capacity.

Meanwhile, when a plurality of battery cells are connected in series or in parallel to configure a battery pack, it is common to configure a battery module composed of at least one battery cell first, and then configure a battery pack by using at least one battery module and adding other components. Here, the battery pack including at least one battery module may be configured as at least an energy storage system according to various voltage and capacity requirements.

A conventional battery module used for configuring an energy storage system includes a firefighting facility structure in order to cope with the risk such as fire caused by overheating that may occur due to the characteristic of the battery cells in a container for containing the battery pack, each including a plurality of battery modules.

However, if a fire starts inside a battery module, it is difficult to quickly extinguish the fire. If the fire is not extinguished quickly inside the battery module or the time for fire spreading is not delayed, the fire may transfer to surrounding battery modules more quickly. Accordingly, if the firefighting facility structure in the rack container is operated, the battery module is highly likely to be too seriously damaged to be recovered.

Therefore, if a fire situation occurs, a more rapid and early suppression is required, and in particular, a measure to prevent an accident in advance by detecting a danger before a fire occurs is necessary. That is, it is required to prevent a successive thermal runaway phenomenon caused by heat propagation to neighboring battery cells due to self-heating of at least one battery cell in a dangerous situation due to an internal short circuit or the like.

To this end, in the unit of a battery module, when an abnormal situation occurs in at least one battery cell, it is required to find a way to ultimately suppress heat propagation and thermal runaway, rather than simply delaying the thermal runaway time.

DISCLOSURE

Technical Problem

The present disclosure is directed to providing a battery module, which may suppress heat propagation and thermal runaway when an abnormal situation occurs in at least one battery cell, and a battery pack and an energy storage system including the battery module.

Technical Solution

In one aspect of the present disclosure, there is provided a battery module, comprising: a plurality of battery cells assemblies, each battery cells assembly of the plurality of battery cells assemblies having a plurality of battery cells stacked on each other; and at least one cooling unit provided between the plurality of battery cells assemblies and filled with a coolant therein, the at least one cooling unit having at least one membrane member provided at one end thereof to be opened or closed according to a change of an internal pressure of the cooling unit.

The at least one membrane member may be opened to communicate the inside of the at least one cooling unit with the outside when the internal pressure of the cooling unit is a predetermined pressure or above.

The at least one cooling unit may further include a main case filled with the coolant; a cover case configured to surround the main case; and the at least one membrane member provided to at least one of the cover case and the main case and exposed out of the cover case.

The at least one membrane member may include a membrane hole provided at a top end of the main case; and a membrane filter provided to the cover case at a position corresponding to the membrane hole to be opened or closed according to a change of the internal pressure of the cooling unit.

The at least one membrane member may be a plurality of membrane members, and the plurality of membrane members may be disposed to be spaced apart from each other by a predetermined distance.

The at least one membrane member may seal the main case when the internal pressure of the cooling unit is smaller than the predetermined pressure and communicate the inside of the main case with the outside of the cover case when the internal pressure of the cooling unit is the predetermined pressure or above.

The main case may be made of a metal material.

The cover case may be made of an insulator.

In addition, the present disclosure provides a battery pack, comprising: at least one battery module according to the former embodiments; and a pack case configured to package the at least one battery module.

Moreover, the present disclosure provides an energy storage system comprising at least one battery pack according to the former embodiments.

Advantageous Effects

According to various embodiments as above, it is possible to provide a battery module, which may suppress heat propagation and thermal runaway when an abnormal situation occurs in at least one battery cell, and a battery pack and an energy storage system including the battery module.

DESCRIPTION OF DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

BEST MODE

The present disclosure will become more apparent by describing in detail the embodiments of the present disclosure with reference to the accompanying drawings. It should be understood that the embodiments disclosed herein are illustrative only for better understanding of the present disclosure, and that the present disclosure may be modified in various ways. In addition, for ease understanding of the present disclosure, the accompanying drawings are not drawn to real scale, but the dimensions of some components may be exaggerated.

Figure 1:
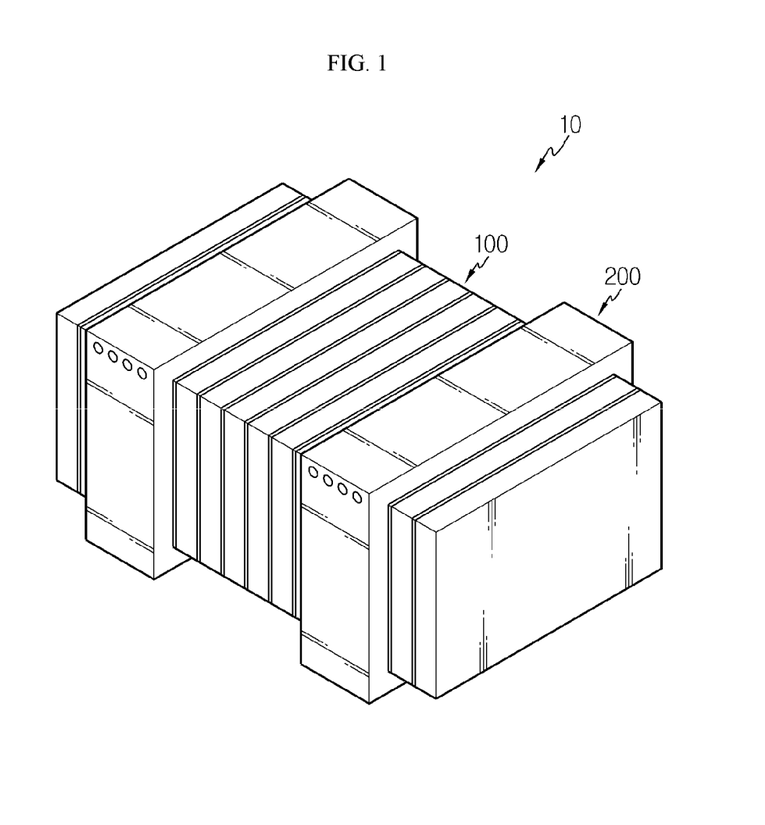
FIG. 1 is a diagram for illustrating a battery module according to an embodiment of the present disclosure.
Figure 2:
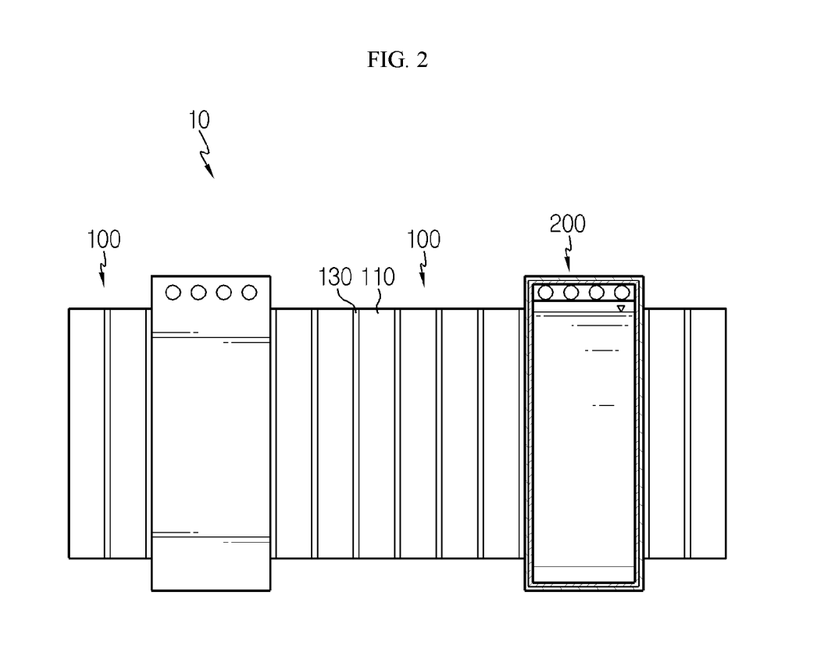
FIG. 2 is a sectional view showing the battery module of FIG. 1.
Figure 3:
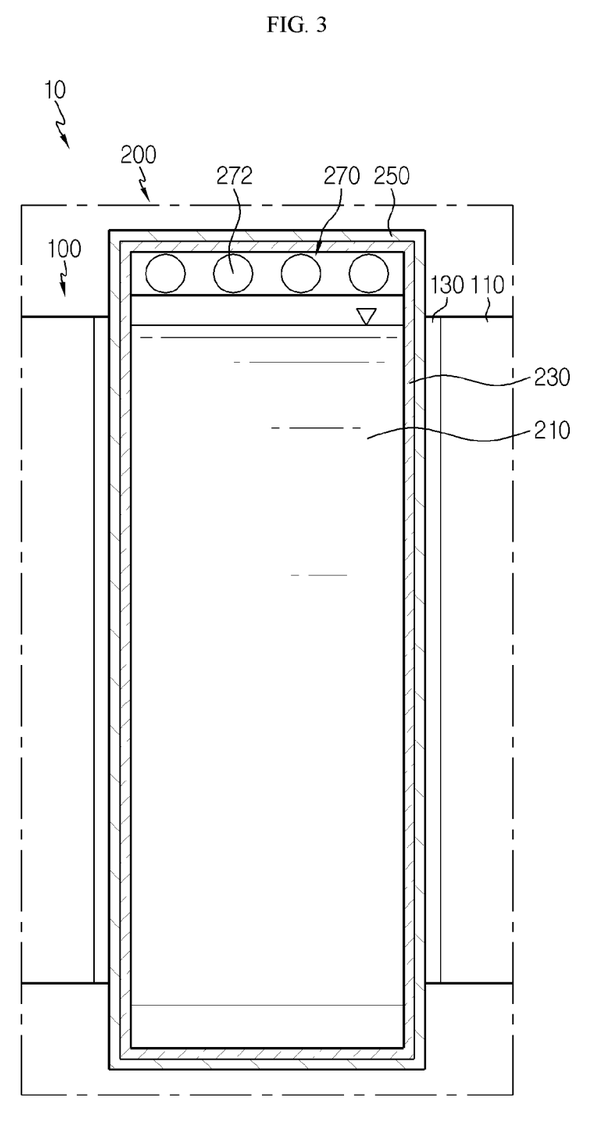
FIG. 3 is an enlarged view showing a main part of the battery module of FIG. 2.
Figure 4:
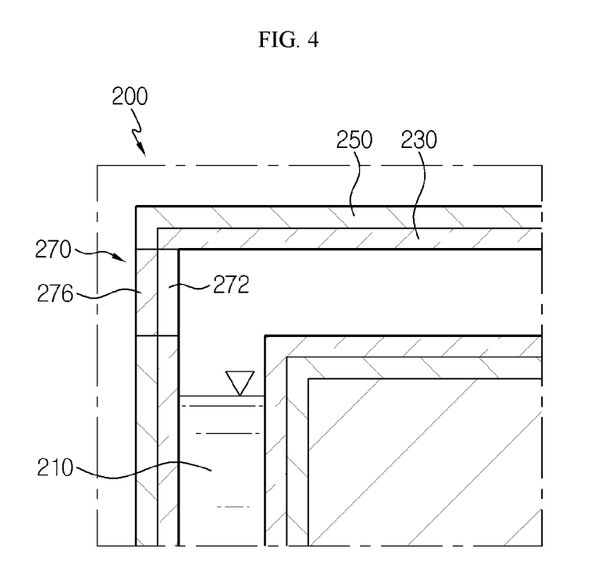
FIG. 4 is a diagram for illustrating a membrane member of a cooling unit, employed at the battery module of FIG. 3.

FIG. 1 is a diagram for illustrating a battery module according to an embodiment of the present disclosure, FIG. 2 is a sectional view showing the battery module of FIG. 1, FIG. 3 is an enlarged view showing a main part of the battery module of FIG. 2, and FIG. 4 is a diagram for illustrating a membrane member of a cooling unit, employed at the battery module of FIG. 3.

Referring to FIGS. 1 to 4, a battery module 10 may include a battery cell assembly 100 and a cooling unit 200.

At least one battery cell assembly 100 or a plurality of battery cell assemblies 100 may be provided. Hereinafter, in this embodiment, it will be described that a plurality of battery cell assemblies 100 are provided.

Each of the plurality of battery cells assemblies 100 may include a battery cell 110 and a cooling plate 130.

The battery cell 110 is a secondary battery, and may be provided as a pouch-type secondary battery, a rectangular secondary battery, or a cylindrical secondary battery. Hereinafter, in this embodiment, it will be described that the battery cell 110 is a pouch-type secondary battery. The battery cell 110 may be provided in plural. The plurality of battery cells 110 may be stacked on each other to be electrically connected to each other.

The cooling plate 130 may be provided in plural. The plurality of cooling plates 130 may be disposed between the plurality of battery cells 110. The plurality of cooling plates 130 may be made of a material with high thermal conductivity. Meanwhile, each of the plurality of cooling plates 130 may have at least one air space capable of cooling the battery cells 110 in an air cooling type.

The cooling unit 200 is used for cooling the plurality of battery cells assemblies 100 and suppressing heat propagation and thermal runaway caused by an abnormal situation. Here, at least one cooling unit 200 or a plurality of cooling units 200 may be provided to be disposed between the plurality of battery cells assemblies 100.

Hereinafter, in this embodiment, it will be described that a plurality of cooling units 200 are provided.

Each of the plurality of cooling units 200 may include a coolant 210, a main case 230, a cover case 250, and a membrane member 270.

The coolant 210 may be filled inside the cooling unit 200, specifically inside the main case 230, explained later, by a predetermined amount. The coolant 210 may be water. The plurality of cooling units 200 according to this embodiment may prevent thermal runaway of the battery cell assembly 100 caused by an abnormal situation by means of the coolant 210 provided as water. Specifically, the coolant 210 may absorb the heat caused in the battery cell assembly 100 by using a latent heat obtained by evaporation of the coolant 210 provided as water, and keep the temperature of neighboring battery cell assemblies 100 at a thermal runaway temperature or below (generally, at about 200° C. or below).

The main case 230 is used for filling the coolant 210 by a predetermined amount, and may be made of a metal material. In this embodiment, the main case 230 may be made of aluminum.

The coolant 210 may be filled by a predetermined amount inside the main case 230. Here, an inner top end of the main case 230 may not be filled with the coolant 210 but form a predetermined empty space.

The cover case 250 may surround the main case 230. The cover case 250 may be made of an insulator. For example, the cover case 250 may be made of EPP (Expanded Polypropylene) foam. However, the cover case 250 may also be made of other insulators known in the art, without being limited thereto.

When the battery cell 110 of the battery cell assembly 100 is heated or heat is generated at the outside before the thermal runaway, the cover case 250 may prevent the coolant 210 inside the main case 230 from changing its phase at an early stage and guide a smooth phase change during the thermal runaway.

The membrane member 270 may be opened or closed according to the change of an internal pressure at one end of the cooling unit 200, specifically at a top end of the main case 230. When the internal pressure is greater than or equal to a predetermined pressure, the membrane member 270 may be opened to communicate the inside of the at least one cooling unit 200, specifically the inside of the main case 230, with the outside. More specifically, the membrane member 270 may seal the inside of the main case 230 when the internal pressure is smaller than the predetermined pressure, and may communicate the inside of the main case 230 with the outside of the cover case 250 when the internal pressure is equal to or greater than the predetermined pressure.

The membrane member 270 is provided to at least one of the cover case 250 and the main case 230, and may be exposed out of the cover case 250.

At least one membrane member 270 or a plurality of membrane members 270 may be provided. Hereinafter, in this embodiment, it will be described that a plurality of membrane members 270 are provided. The plurality of membrane members 270 may be disposed to be spaced apart from each other by a predetermined distance.

Hereinafter, the plurality of membrane members 270 will be described in more detail.

Each of the plurality of membrane members 270 may include a membrane hole 272 and a membrane filter 276.

The membrane hole 272 may be provided at the top end of the main case 230. The membrane hole 272 may be disposed to face the membrane filter 276, explained later.

The membrane filter 276 may be provided at a position corresponding to the membrane hole. The membrane filter 276 is provided to the cover case 250, and may be configured to be opened and closed at the cover case 250 according to the change of the internal pressure. Accordingly, the cover case 250 may have a predetermined hole in which the membrane filter 276 is mounted to be opened and closed.

If the membrane filter 276 is opened, the top end of the main case 230 may be exposed out of the cover case 250 through the membrane hole 272. Meanwhile, the membrane filter 276 may also be provided to the main case 230 to open and close the membrane hole 272. In this case, the cover case 250 may have an opening through which the membrane filter 276 may expose the membrane hole 272 out of the cover case 250 without interference when the membrane filter 276 is opened.

Hereinafter, detailed operations of this embodiment when the internal pressure of the cooling unit 200 increases will be described in more detail.

Figure 5:
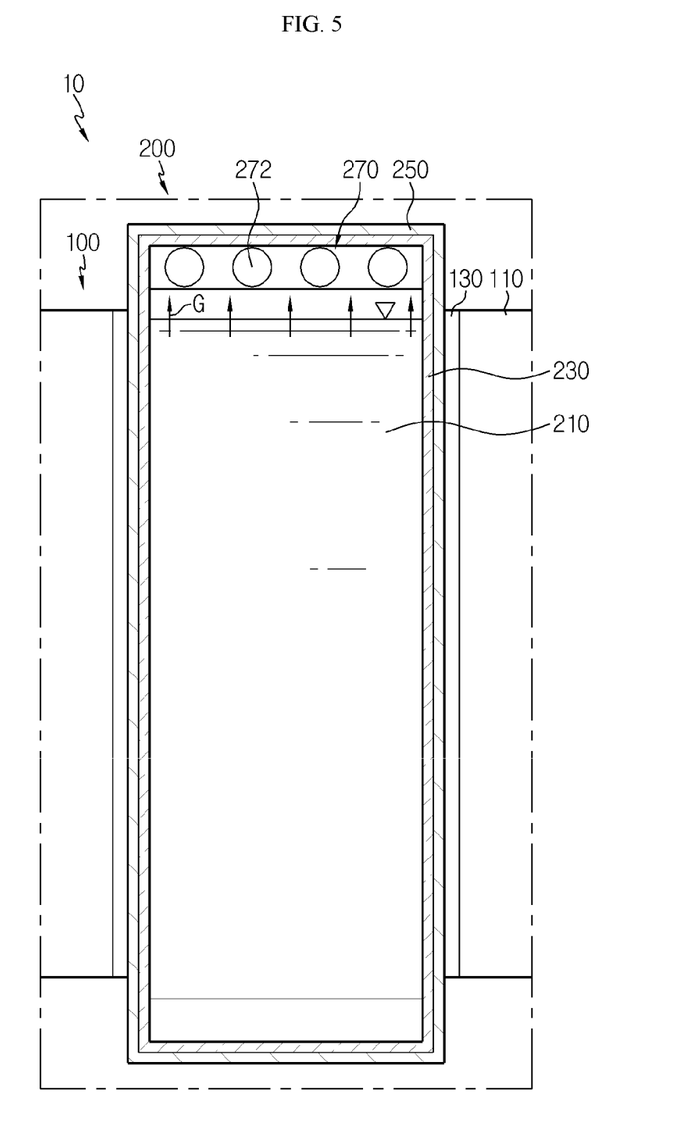
FIGS. 5 to 7 are diagrams for illustrating an operation of the battery module of FIG. 1 when an internal pressure of the cooling unit rises.
Figure 6:
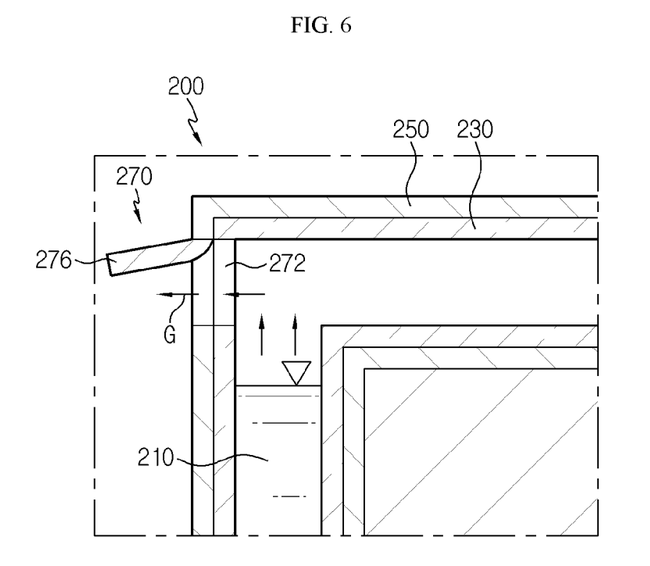
Figure 7:
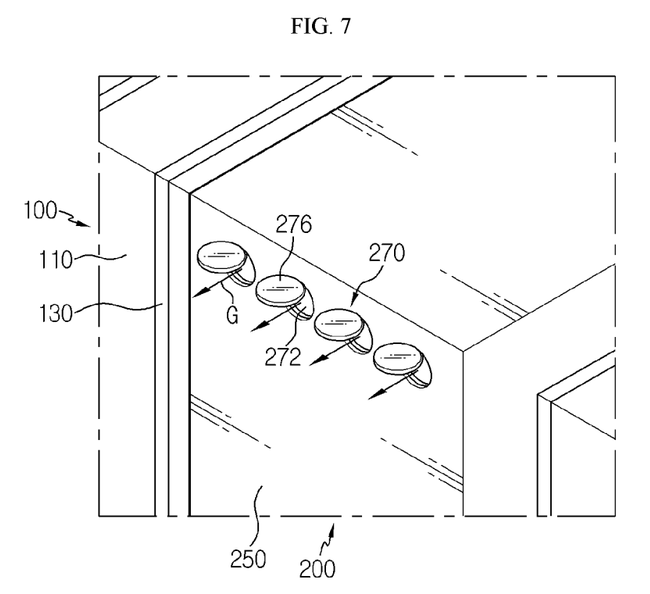

FIGS. 5 to 7 are diagrams for illustrating an operation of the battery module of FIG. 1 when an internal pressure of the cooling unit rises.

Referring to FIGS. 5 to 7, in the battery module 10, when an abnormal situation occurs in at least one battery cell 110 of the battery cell assembly 100 due to an internal short circuit or the like, the temperature of the battery cell assembly 100 may rise. As the temperature rises, the temperature of the coolant 210 inside the main case 230 of the cooling unit 200 rises, so that the coolant 210 may change its phase into vapor G.

When the vapor G is generated by a predetermined amount, the internal pressure of the main case 230 increases, and if the internal pressure increases to the predetermined pressure or above, the membrane filter 276 of the membrane member 270 may be opened.

As the membrane filter 276 is opened, the vapor G inside the main case 230 may be discharged out of the cover case 250 through the membrane hole 272. Therefore, when an abnormal situation occurs, the membrane member 270 may prevent the pressure inside the cooling unit 200 from increasing excessively.

Moreover, the discharged vapor G may minimize the propagation of venting gas, sparks, flames, or the like, which may occur in the battery cell assembly 100 due to an abnormal situation, to neighboring battery cell assemblies 100.

In this embodiment, by using the cooling unit 200 filled with is the coolant 210 provided as water, it is possible to operate an effective cooling system by natural convective heat transfer and phase change without additional equipment such as a separate sensor or controller.

Therefore, in this embodiment, by using the cooling unit 200, it is possible to more efficiently suppress heat propagation and thermal runaway that may be caused when an abnormal situation occurs in the at least one battery cell 110 of the battery cell assembly 100, and heat propagation and thermal runaway risks may be prevented in advance more effectively.

Figure 8:
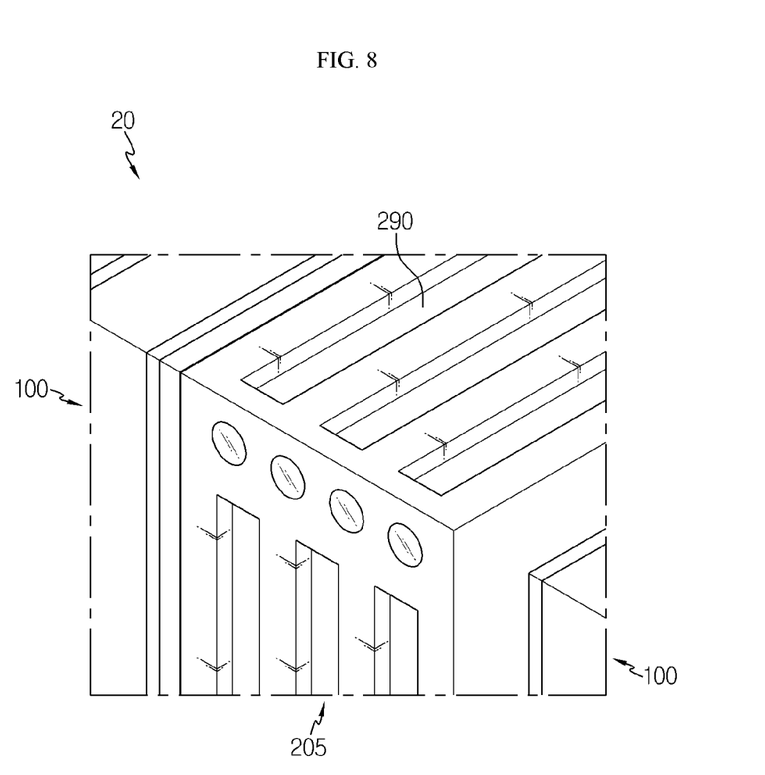
FIG. 8 is a diagram for illustrating a battery module according to another embodiment of the present disclosure.

FIG. 8 is a diagram for illustrating a battery module according to another embodiment of the present disclosure.

Since a battery pack 20 of this embodiment is similar to the battery pack 10 of the former embodiment, features substantially identical or similar to those of the former embodiment will not be described again, and hereinafter, focusing features different from the former embodiment will be described in detail.

Referring to FIG. 8, the battery pack 20 may include a battery cell assembly 100 and a cooling unit 205.

The battery cell assembly 100 is substantially identical or similar to that of the former embodiment and thus will not be described again.

A plurality of grooves 290 may be formed at an outer surface of the cooling unit 205 by a predetermined length along at least one of a longitudinal direction and a height direction of the cooling unit 205. The cooling unit 290 according to this embodiment may further secure an outer surface area of the cooling unit 205 by means of the plurality of grooves 290.

Figure 9:
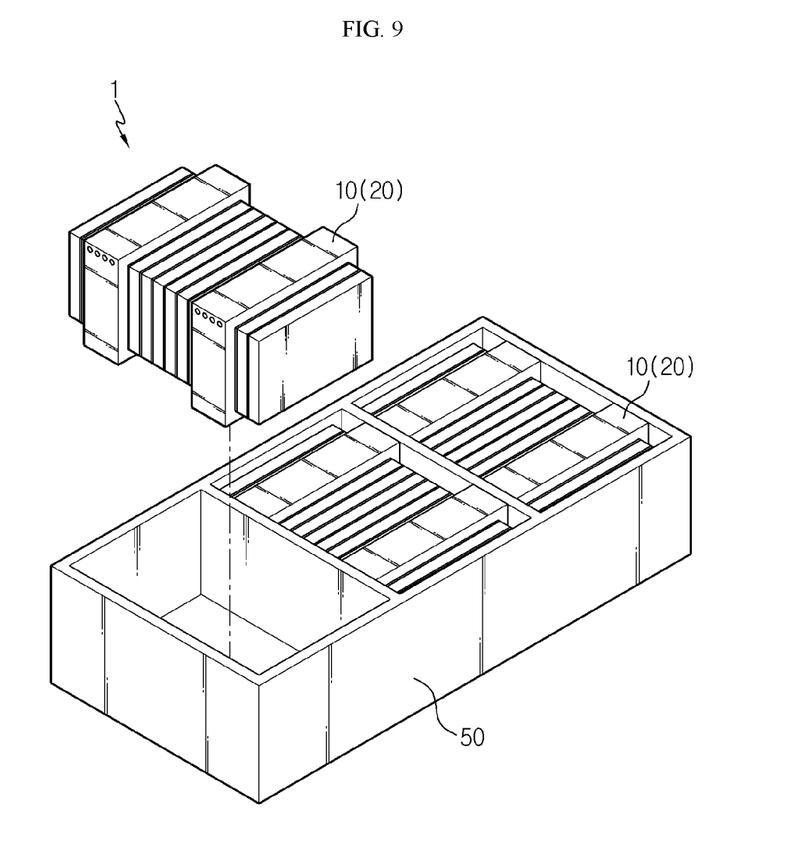
FIG. 9 is a diagram for illustrating a battery pack according to an embodiment of the present disclosure.

FIG. 9 is a diagram for illustrating a battery pack according to an embodiment of the present disclosure.

Referring to FIG. 9, a battery pack 1 may include at least one battery module 10, 20 of the former embodiment and a pack case 50 configured to package the at least one battery module 10, 20.

The battery pack 1 may be provided to a vehicle as a fuel source for the vehicle. For example, the battery pack 1 may be provided to an electric vehicle, a hybrid electric vehicle, or other vehicles that may use the battery pack 1 as a fuel source in various ways. In addition, the battery pack 1 may also be provided to other devices, instruments or facilities using a secondary battery, such as an energy storage system, in addition to the vehicle.

As described above, since the battery pack 1 according to this embodiment includes the battery module 10, 20 described above, it is possible to implement a battery pack 1 having all the advantages of the battery module 10, 20 described above.

Figure 10:
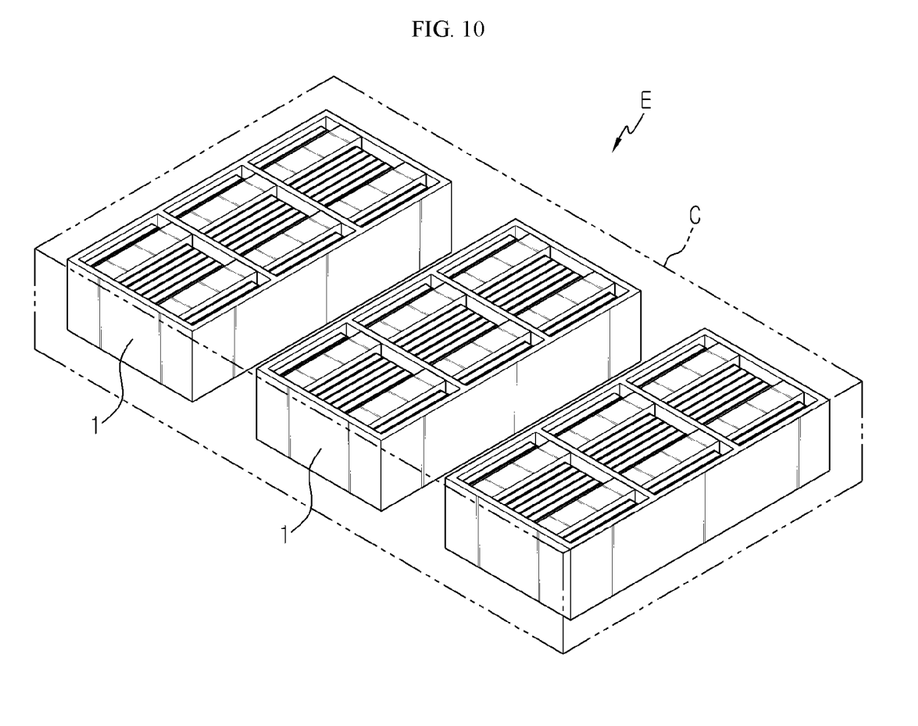
FIG. 10 is a diagram for illustrating an energy storage system according to an embodiment of the present disclosure.

FIG. 10 is a diagram for illustrating an energy storage system according to an embodiment of the present disclosure.

Referring to FIG. 10, the energy storage system E may be used as an energy source for home or industrial use. The energy storage system E may include at least one battery pack 1 of the former embodiment, or a plurality of battery packs in this embodiment, and a container C configured to accommodate the plurality of battery packs 1.

Since the energy storage system E according to this embodiment includes the battery pack 1 of the former embodiment, it is possible to provide an energy storage system E having all the advantages of the battery pack 1 of the former embodiment.

According to various embodiments as above, it is possible to provide a battery module 10, which may suppress heat propagation and thermal runaway when an abnormal situation occurs in at least one battery cell 110, and a battery pack 1 and an energy storage system E including the battery module 10.

After all, in this embodiment, by using the cooling unit 200, it is possible to more effectively and fundamentally suppress heat propagation and thermal runaway when an abnormal situation occurs in at least one battery cell 110, in the unit of battery module 10.

While the embodiments of the present disclosure have been shown and described, it should be understood that the present disclosure is not limited to the specific embodiments described, and that various changes and modifications can be made within the scope of the present disclosure by those skilled in the art, and these modifications should not be understood individually from the technical ideas and views of the present disclosure.

What is claimed is:

1. A battery module, comprising:
    a plurality of battery cells assemblies, each battery cells assembly of the plurality of battery cells assemblies having a plurality of battery cells stacked on each other; and
    at least one cooler provided between the plurality of battery cells assemblies and filled with a coolant therein, the at least one cooler having a main case having at least one membrane hole and a cover case having a membrane filter covering the at least one membrane hole to seal the at least one membrane hole to be opened or closed according to a change of an internal pressure of the cooler.

2. The battery module according to claim 1, wherein the at least one membrane hole is opened to communicate the inside of the at least one cooler with the outside when the internal pressure of the cooler is a predetermined pressure or above.

3. The battery module according to claim 1, wherein the main case is filled with the coolant.

4. The battery module according to claim 3, wherein the membrane filter seals the main case when the internal pressure of the cooler is smaller than a predetermined pressure and communicates the inside of the main case with the outside of the cover case when the internal pressure of the cooler is the predetermined pressure or above.

5. The battery module according to claim 3, wherein the main case is made of a metal material.

6. The battery module according to claim 3, wherein the cover case is made of an insulator.

7. The battery module according to claim 1, wherein the at least one membrane hole is a plurality of membrane holes, and
    wherein the plurality of membrane holes are disposed to be spaced apart from each other by a predetermined distance.

8. A battery pack, comprising:
    at least one battery module as defined in claim 1; and
    a pack case configured to package the at least one battery module.

9. An energy storage system, comprising:
    at least one battery pack as defined in claim 8.

10. The battery module according to claim 1, wherein the at least one cooler completely encircles one of the plurality of battery cells assemblies.

11. The battery module according to claim 1, wherein the at least one cooler is a plurality of coolers, and
    wherein each of the plurality of battery cells assemblies is completely encircled by one of the plurality of coolers.

* * * * *